United States Patent [19]

Hanson et al.

[11] Patent Number: 5,249,242

[45] Date of Patent: Sep. 28, 1993

[54] METHOD FOR ENHANCING RASTER PIXEL DATA

[75] Inventors: William J. Hanson, Carlsbad; Richard I. Love, Oceanside; R. Daniel Putman, Palo Alto, all of Calif.

[73] Assignee: Adobe Systems Incorporated, Mountain View, Calif.

[21] Appl. No.: 813,203

[22] Filed: Dec. 23, 1991

[51] Int. Cl.⁵ .............................................. G06K 9/40
[52] U.S. Cl. ...................................... 382/54; 358/447; 382/27
[58] Field of Search ....................... 382/25, 27, 54, 49, 382/55; 358/447, 455, 456

[56] References Cited

U.S. PATENT DOCUMENTS

| | | | |
|---|---|---|---|
| 4,506,382 | 3/1985 | Hada et al. | 382/49 |
| 4,630,307 | 12/1986 | Cok | 382/27 |
| 4,648,119 | 3/1987 | Wingfield et al. | 382/27 |
| 4,742,399 | 5/1988 | Kitamura | 382/27 |
| 4,783,753 | 11/1988 | Crimmins | 382/54 |
| 4,799,270 | 1/1989 | Kim et al. | 382/27 |

Primary Examiner—Joseph Mancuso
Attorney, Agent, or Firm—Roger S. Borovoy

[57] ABSTRACT

Briefly, the invention provides a method of enhancing pixel data from a raster image to improve the appearance of the rendered image by modifying morphological artifacts which normally occur in raster image systems. The method commences by applying a window to a portion of the raster pixel data from the raster images to define a block of raster pixel data having a predetermined area. The pattern of the block of raster data within the window is then compared with a plurality of predetermined patterns representing morphological artifacts. A determination is made from the comparison whether a substantial match exists between the block of raster data within the window and one or more of the plurality of predetermined patterns. In the event of a match the block of raster data is modified to provide an enhanced block of raster pixel data free of said morphological artifacts. Finally, the window is applied to a different block of raster data and the process is repeated until all of the raster data is free from the undesired morphological artifacts.

8 Claims, 19 Drawing Sheets

NORMALLY "ALIASED" LINE

"ANTIALIASED" LINE

STANDARD VIDEO PIXEL

POSITIONAL MODULATION

PIXEL DIAMETER MODULATION
(PULSE WIDTH)

STROKE LENGTH MODULATION
(PULSE WIDTH)

DENSITY MODULATION
(CHOPPED VIDEO)

UNMODIFIED HALFTONE DOT

DISPERSING PIXELS IN HALFTONE
CELL TO "SOFTEN" DOT

DENSITY MODULATION

METHOD FOR ENHANCING RASTER PIXEL DATA

This invention relates to a method of enhancing the quality of images printed using raster printing techniques, such as laser-scanned electrophotography. The method is also applicable to other raster and/or matrix imaging technologies, such as ink jet printing, thermal printing, dot matrix printing and CRT displays.

BACKGROUND OF THE INVENTION AND PRIOR ART

Imaging technologies which employ raster and/or matrix addressing techniques are used widely in electronic printing and in electronic display devices. These technologies create two-dimensional images from small image dots, or picture elements (pixels), placed in a two-dimensional, addressable array. The size and spatial placement frequency of these pixels are important variables defining the quality of the images which can be produced by raster and matrix imaging systems. FIG. 1 depicts an alphanumeric character produced by a prior art raster imaging system. A raster imaging system produces output by scanning successive lines of dots onto a surface. Laser xerographic, inkjet, electrostatic, thermal transfer, magnetographic, dot matrix, ion deposition, laser film and laser erosion are all raster imaging systems.

The picture elements in a printed image are typically arranged in such fashion that a simulation, or analog, of the ideal printed image is provided. The degree to which this analog simulates the ideal or "perfect" rendering of the image is dependent upon a number of factors in the imaging system including spatial addressability, pixel size, dynamic density range of pixels (number of gray levels), placement consistency, rasterizing algorithms and consistency of the imaging process. To the extent that each of these variables is not optimized, the overall quality of the printed or displayed image may be compromised.

Most raster image printing systems in use today employ simple rendering techniques that approximate the ideal image by constructing an array of high contrast pixels. An example of an alphanumeric character produced by such an array is depicted in FIG. 1. The black areas are the imaged pixels. The small overlapping circles depict the addressable locations where pixels can be placed.

While current raster and matrix based imaging systems produce reasonable simulations of ideal images, they can also produce a variety of undesirable artifacts. These artifacts include jaggies, raster pitch errors, quantization errors and grainy halftone images. All of these terms relate to defects which are caused by the fact that the images are created by approximating the optimum rendering of the image, subject to limitations in the spatial addressability of the two-dimensional matrix array. The precision with which image pixels are placed in the array is referred to as addressability. The addressability of typical current generation laser printers is 300 dots/inch. This means that the smallest incremental distance in which a pixel can be positioned in a 300 dot/inch laser printer is 1/300 inch.

Some of the above artifacts result from periodically occurring errors in the spatial placement of some of the image pixels. These pixel placement errors result in a structured pattern in the image which is frequently noticeable to the human eye, and which can be quite objectionable. An example of such an artifact is the jagged appearance of the edge of a straight line, such as the edge of the letter A in FIG. 1, which is rendered at an angle diagonal to the primary axes of a two-dimensional matrix array.

When viewing a document or a display, an observer sees an image comprised of a large number of image features. The degree to which the observer can detect various features in the image depends upon a variety of factors, one of which is the size of the feature of interest. The degree to which features of varying size can be detected by the observer is dependent upon the visual system spatial frequency response of the observer. FIG. 16 depicts the spatial frequency response of a typical observer viewing a printed document. This figure shows the degree to which the observer can detect variations in optical density (i.e., density modulation) which occur periodically across a page as a function of the spatial frequency of the density modulation. A high spatial frequency corresponds to very small image elements and/or spaces between elements. A low spatial frequency corresponds to large image elements and/or spaces between elements. It will be noted that the peak visual response to spatially modulated density patterns occurs at spatial frequencies of about 0.5-2 cycles/mm.

One type of undesirable artifact is called a "jaggie". FIG. 2 is a magnified view of the letter "A" produced on a matrix imaging device which exhibits a jagged edge, or jaggie. It will be noted that the quantization errors associated with placing pixels in the available matrix locations create periodically varying pixel placement errors along the imaged line. Depending upon the magnitude of each placement error and the spatial frequency of periodically occurring errors, such a raster artifact may or may not be visible to the naked eye.

The degree to which the jaggie depicted in FIG. 2 is noticeable to the human eye depends upon the magnitude and frequency of the jaggies and their relationship to the spatial frequency response of the human observer. The detectability (and thus the objectionability) of these raster artifacts is determined by both the amplitude and the frequency of the jaggies, mapped against the human visual spatial frequency response as indicated in FIG. 3. If the combination of raggedness amplitude and spatial frequency of a jagged edge of an image falls below the detectability threshold, as indicated in FIG. 3, then the jaggie will not be detected under normal viewing conditions. If, however, the amplitude and spatial frequency of periodically occurring jaggies falls above the detectability threshold, then the jaggies will be noticeable to most observers.

This does not necessarily mean that jaggies located just above the detectability threshold will be objectionable. Objectionability of jaggies is subjective and can vary considerably from one observer to another. In general, however, the further above the detectability threshold that a given jagged image element lies, the more noticeable and the more objectionable such a jagged artifact will be to most observers.

A variety of techniques have been developed to reduce the objectionability of jaggies and other artifacts in raster and matrix imaging systems. Many prior art anti-aliasing techniques have been developed for CRT displays. These techniques reduce the appearance of jaggedness in lines oriented off the horizontal or vertical axes by blurring or smoothing the image elements at transition steps or inflection points. This blurring is depicted graphically in FIG. 4. Such intentional blurring is accomplished by gradually varying the intensity of the CRT electron beam as it approaches the jagged image transitions. In non-antialiased CRT displays, there is an abrupt intensity transition across these image edges.

A variety of prior art techniques have been developed for smoothing edge artifacts, such as jaggies, specifically in electrophotographic printing systems including laser printers. U.S. Pat. No. 4,625,222 assigned to IBM, discloses techniques in which gray pixels are substituted for black or white pixels in a laser printing system to smooth the density transition between image and background areas at jagged edges. The IBM technique substitutes these gray pixels during rasterization of the high level representation of the computer-generated image. This substitution occurs as part of the formation of the bit-mapped rendition of the image in the printer raster image processor. The substitution of gray pixels at this point in the imaging process requires the use of a multiple plane bit-map to enable the digital representation of image pixels using values other than black or white. More than one bit per pixel is required if more than two values of output density per pixel are to be rendered. The use of a multiple plane bit-map increases the amount of RAM required in the raster image processor (RIP), which increases the cost of the RIP correspondingly. Furthermore, the IBM technique modulates the laser beam intensity to enable imaging of gray pixels. This requires additional hardware which adds significantly to the cost of the system.

Other techniques have been disclosed in U.S. Pat. No. 4,437,122 assigned to Xerox and U.S. Pat. No. 4,847,641 assigned to Hewlett-Packard. These techniques are directed to enhancing the quality of raster images produced on laser printing systems. Both the Xerox and the Hewlett-Packard techniques enhance the edge characteristics of raster images.

The pattern matching process in the Xerox and Hewlett-Packard patents is performed on a pixel-by-pixel basis to identify individual pixels which are to be corrected. Corrections on these identified pixels are also performed on a pixel-by-pixel basis. Both the Xerox and Hewlett-Packard techniques examine an image pixel of interest, compare it and neighboring pixels to comparison templates in a two-dimensional, symmetrical array (with the pixel of interest positioned at the center of the array) and then make modifications to the pixel of interest if a pattern match is found with one of the comparison templates.

Each pixel in the entire print (i.e., 8.4 million pixels in a 300 dpi, 8½×11 inch print) is compared to a large number of matching templates (more than 100 templates in the Hewlett-Packard technique). The types of corrections which can be made include breaking the identified pixel or pixels into smaller sub-pixels to enable image edge corrections using sub-pixels (Xerox) or modulating the size of the pixel by pulse width modulation or by positional adjustment in the fast scan direction (Hewlett-Packard).

The Xerox and Hewlett-Packard techniques operate on the image after a bit-mapped representation of the image has been produced. They do not require the additional memory and cost associated with the multi-plane bit image of the IBM approach. To this extent, they improve on the IBM process.

Other prior art anti-aliasing techniques, such as those employed in CRT's, are specific to continuous tone imaging systems, such as CRT's in which the pixel intensity can be modulated in a continuous tone, analog fashion. Electrophotography does not readily lend itself to continuous tone printing.

The above prior art techniques take a "pixel-oriented" view of the raster artifact problem. They provide a basis for "correcting" individual pixels based upon empirically-derived pixel corrections to improve the appearance of images. They do not directly address the underlying issue associated with the perception of raster artifacts, i.e., image edge morphology.

Image edge morphology relates to the spatially modulated shape characteristics of the edges of image elements. The perceptual response to jaggies is a response to the morphological characteristics of the edge of an image element. Humans have a psychophysical response to images which have perceived spatial errors, i.e., dimensional errors or spatially periodic fluctuations. Contrary to the above prior art techniques, this invention provides a method to resolve these artifacts based on morphological characteristics of images in a more efficient manner than the "central pixel correction" approaches employed, for example, in the Xerox and Hewlett-Packard patents.

Another type of objectionable artifact of halftone images is graininess. Images produced by high contrast raster and matrix imaging systems often are not capable of rendering good continuous tone pictorial images. Techniques have been developed in the graphic arts to simulate continuous tone images by employing halftone printing techniques. Halftoning, utilizing both optical screening and digital scanning techniques, is well understood in the art and will not be described here in detail.

Halftoning techniques produce a representation of an image which is intended to simulate a continuous tone pictorial scene using a high contrast imaging process. Variations in scene darkness are simulated by varying the local area coverage of the ink (or toner) used to produce the image. By locally modulating the ink area coverage of an image, a simulation of optical density modulation can be produced. Halftoning accomplishes this by utilizing an array of halftone dots and locally modulating the size (and corresponding coverage area) of the dots, thereby simulating continuous tone density modulation. In raster and matrix imaging systems, these halftone dots are typically constructed from clusters or sub-arrays of pixels. This is depicted graphically in FIG. 17.

The halftone dots in halftone imaging systems are typically arranged in a two-dimensional array of halftone dots with a uniform spacing between them. Ideally, the halftone array would consist of very closely spaced, small dots having a high spatial frequency dot pattern to minimize the perception of graininess in the halftone image. The spatial placement frequency of halftones is referred to as the halftone screen frequency. Experience in the graphic arts has shown that screen frequencies above 150 dots/inch produce very little detectable graininess, whereas screen frequencies between 10 and 85 dots/inch produce very noticeable and objectionable graininess.

In raster and matrix printing systems, halftone dots are constructed using arrays of imaged pixels. Since multiples of imaged pixels are required to construct halftone dots, halftone screen frequencies by necessity occur at lower spatial frequencies than printer addressability frequency. For example, if 26 density steps (white plus 25 levels of "gray") are desired from a 300 dpi laser printer, a halftone cell of 5×5 pixels would be required, resulting in a screen frequency of 300/5 or 60 dots/inch. The halftone images produced by such a system would have a very noticeable graininess.

The production of halftone images from a high-contrast raster or matrix imaging system requires a trade-off of two image output variables: screen graininess and number of gray levels. The larger the number of desired gray levels, the more imaging pixels will be required in the halftone cell and therefore the grainier the resulting halftone image becomes.

The perception of graininess in a halftone image is determined, once again, by the spatial frequency response to the observer. As is the case with jaggies and other spatially modulated artifacts, the highest degree of sensitivity to halftone structure occurs at spatial frequencies of about 0.3-3 cycles/mm. This corresponds to halftone screen frequencies of about 8-75 dots/inch.

The pictorial images printed by raster or matrix printing systems are typically downloaded from a host computer or an input scanner as a screened halftone representation of the image. These images typically have been halftoned using very simple halftoning algorithms and typically are screened at halftone frequencies which produce a very objectionable graininess in the printed image, for example, at 60 dpi.

BRIEF DESCRIPTION OF THE INVENTION

Briefly, the invention provides a method of enhancing pixel data from a raster image to improve the appearance of the rendered image by modifying morphological artifacts which normally occur in raster image systems. The method, as shown in the flow chart of FIG. 19, commences by applying a window to a portion of the raster pixel data from the raster images to define a block of raster pixel data having a predetermined area. The pattern of the block of raster data within the window is then compared with a plurality of predetermined patterns representing morphological artifacts. A determination is made from the comparison whether a substantial match exists between the block of raster data within the window and one or more of the plurality of predetermined patterns. In the event of a match, the block of raster data is modified to provide an enhanced block of raster pixel data free of these morphological artifacts. Finally, the window is applied to a different block of raster data, and the process is repeated until all of the raster data is free from the undesired morphological artifacts.

The method of the invention is best applied to an electrophotographic printer, such as a laser printer, although it also may be employed in other electrophotographic systems, such as LED imaged devices and also to non-electrophotographic systems, such as ink jet and thermal printers.

DETAILED DESCRIPTION OF A PREFERRED EMBODIMENT OF THE INVENTION

Figure 5:
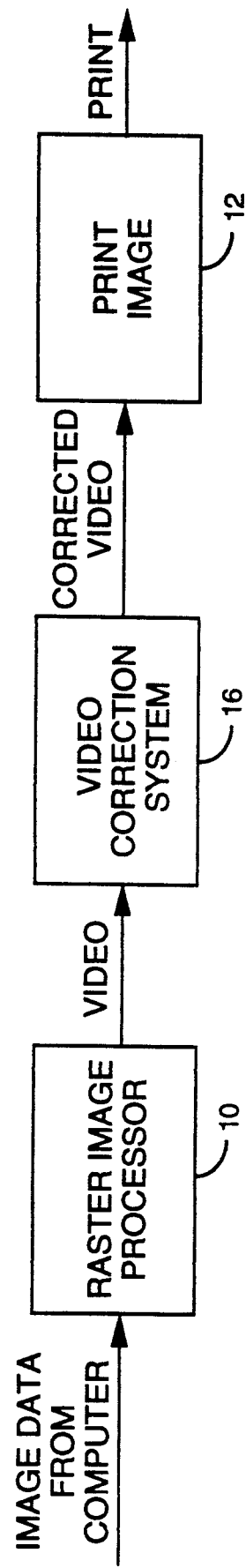
FIG. 5 is a block diagram of the essential components of the apparatus used in the method of the invention.

Referring to FIG. 5, the method of enhancing raster pixel data of the invention includes the steps of passing image data into the RIP 10, through video correction system 16 and the transfer of the corrected bit-mapped data to the print engine 12 for printing. The format of the data which passes between RIP 10 and print engine 12 is referred to as video. In a laser printer, the video signal is the temporally modulating electrical signal from RIP 10 which modulates the laser beam. The temporally modulated laser beam then creates a spatially modulated exposure pattern as the beam scans across the moving photoconductor in a raster fashion.

Figure 6:
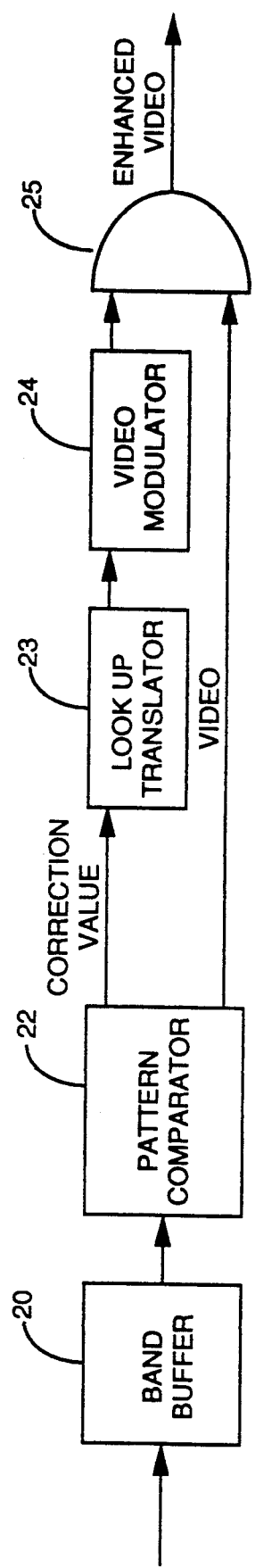
FIG. 6 is a block diagram illustrating the correction system of the invention.

Referring to FIG. 6, the video correction system of the invention consists of band buffer 20, pattern comparator 22, look-up translator 23, video modulator 24 and output gate 25.

Figure 7:
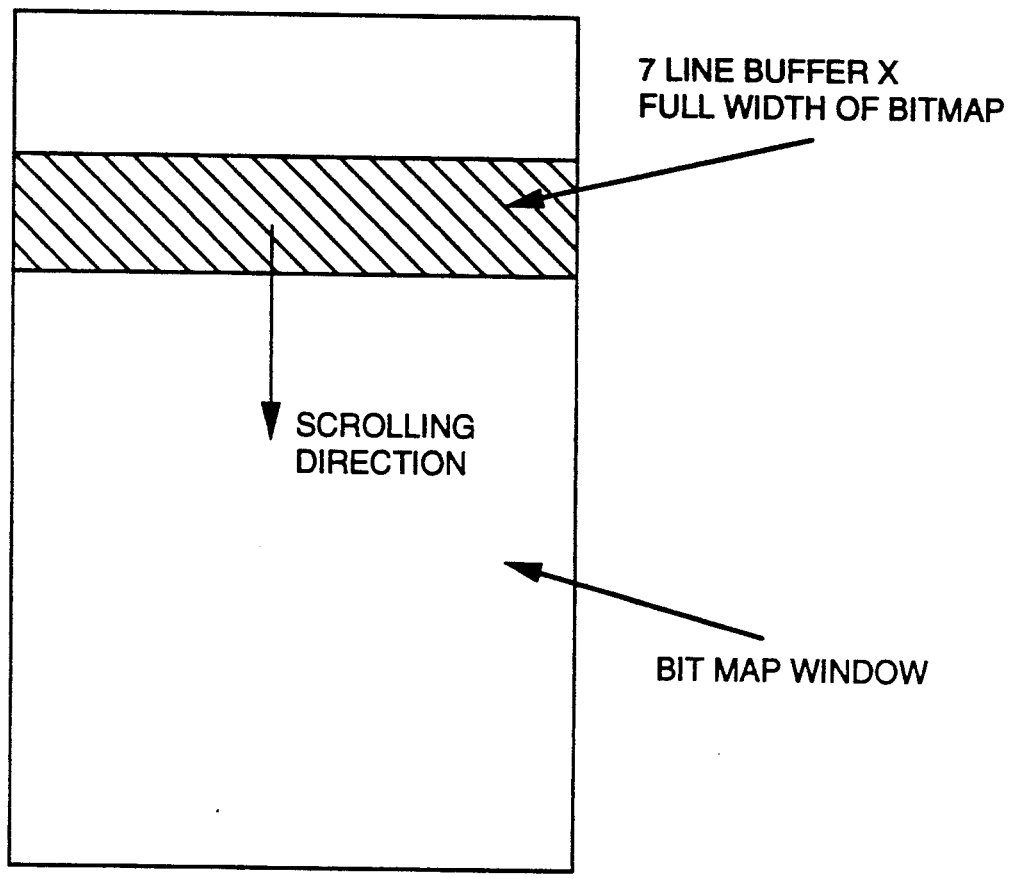
FIG. 7 illustrates the use of a vertical scrolling band.

Band buffer 20 captures and buffers a band of a plurality of scan lines at a time, for example, seven from the bit-mapped rendering of the image, which typically is contained in a bit-map RAM as is well known in the art. This band initially consists of the top seven scan lines of the bit-mapped image. The band is interrogated by pattern comparator 22. After interrogation of the band is completed, a new band is stored by moving the band buffer down one scan line of the bit-mapped image. Accordingly, the band is scrolled down the bit-map of the page in scan line sequence, creating a new seven-line buffered image segment each time it scrolls down another line of the bit-mapped image. This is depicted graphically in FIG. 7.

Figure 1:
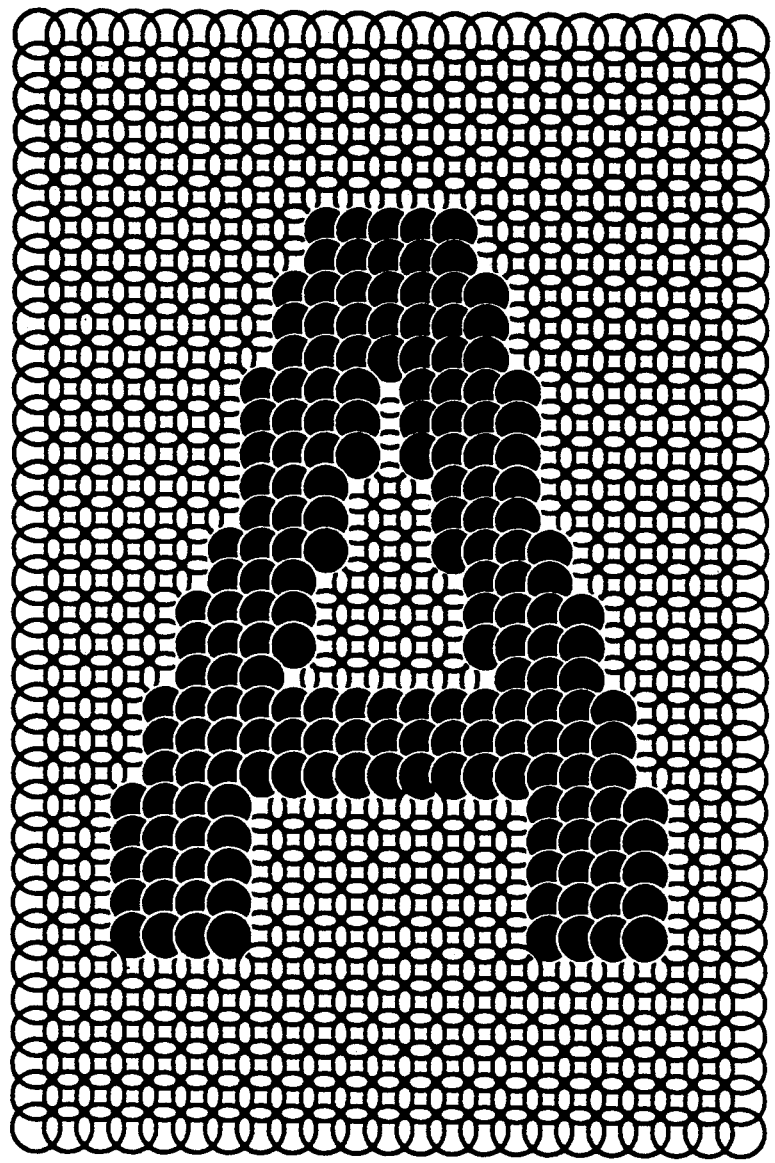
FIG. 1 illustrates a prior art representation of a character.
Figure 2:
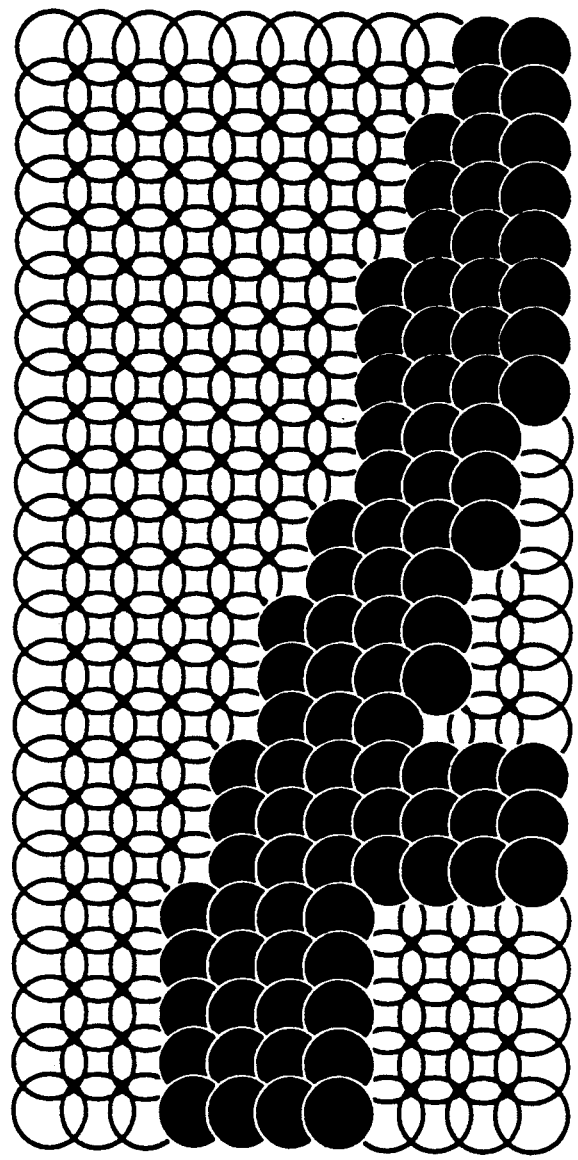
FIG. 2 illustrates a prior art representation of a blow-up of a portion of the character shown in FIG. 1.
Figure 3:
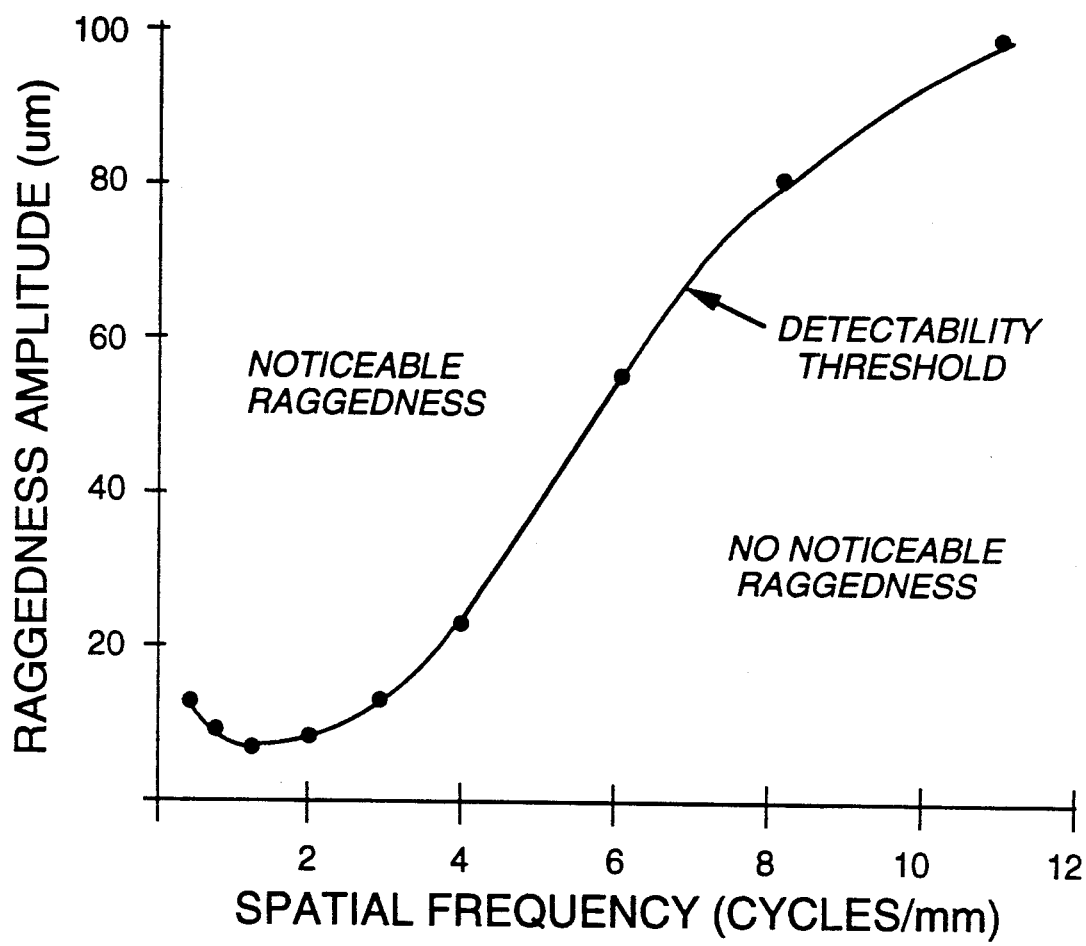
FIG. 3 is a graph illustrating the threshold at which raggedness becomes noticeable to the viewer.
Figure 4:
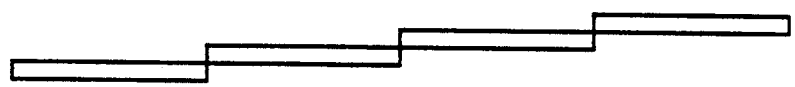
FIG. 4 compares an aliased line with an anti-aliased line.
Figure 4:
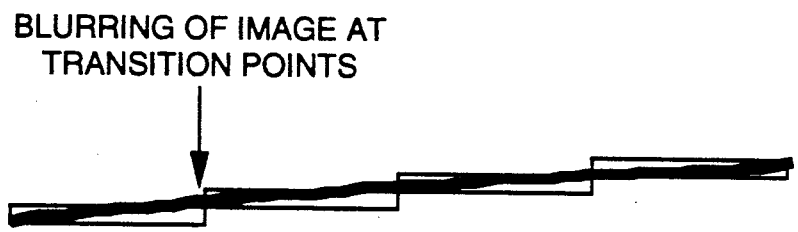
Figure 8:
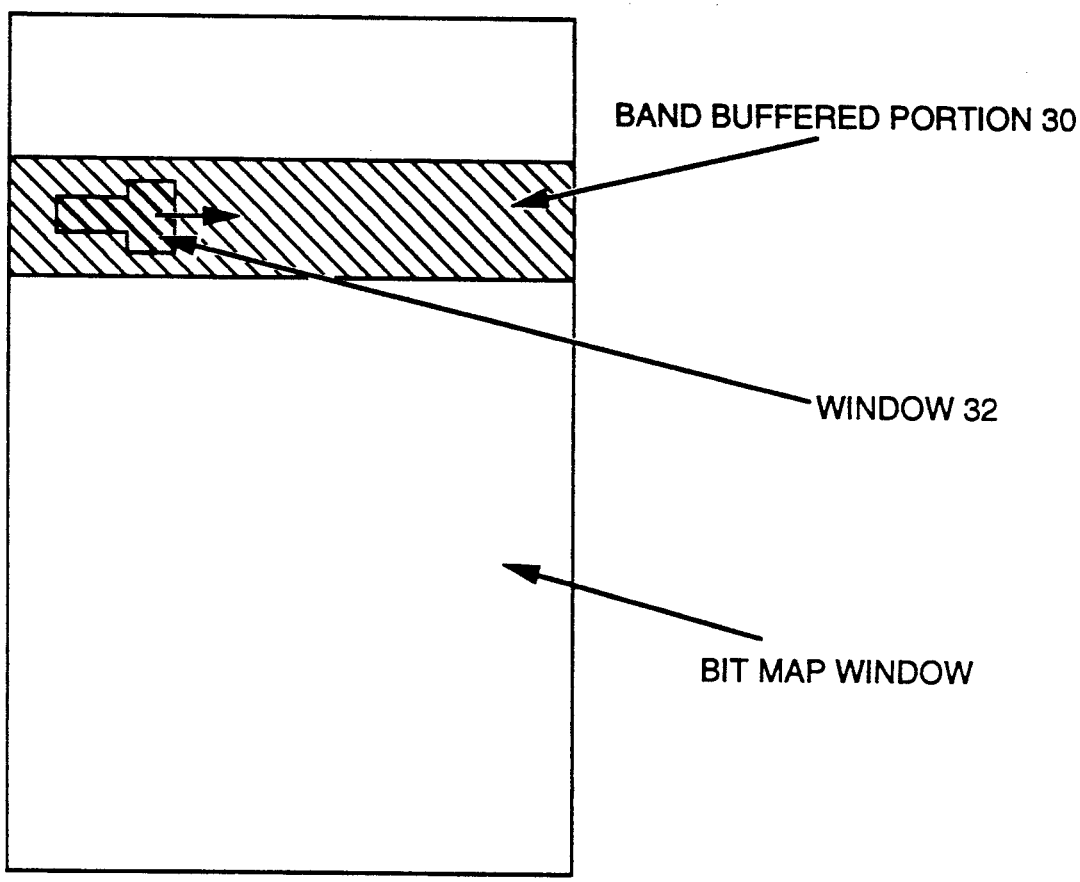
FIG. 8 illustrates the relationship between the scrolling band and the window.

Next, the bit-mapped image of each new band is examined in order to decide whether modifications are required to eliminate or reduce the effects of morphological artifacts. Referring to FIG. 8, the pattern comparison function is performed on the band buffered portion 30 of the bit-mapped image. A comparison window 32, which may be of a variety of shapes, such as the T-shaped window shown in FIG. 8, is overlaid upon the band buffered image 30 and dragged from left to right across the band. The window 32 depicted in FIG. 8 works well to identify jaggies in 300 dpi images. Other window shapes may be better suited for other images, densities or to isolate other types of artifacts. As the window 32 is dragged across the band, the portion of the bit-mapped image contained within window 32 is compared with predetermined templates of undesirable image patterns. These predetermined templates are patterns which define certain morphological characteristics of images which correspond to noticeable and objectionable raster artifacts. Artifacts which are noticeable and/or objectionable in raster images have particular spatial and morphological characteristics. The degree to which these characteristics are noticeable and/or objectionable is determined by, among other things, the spatial amplitude and spatial frequency of periodic artifacts, and how these spatially occurring artifacts map to the perceptual sensitivity of an observer. The perceptual sensitivity to edge raggedness or jaggies is illustrated in FIG. 3. The area of noticeable raggedness is indicated above and to the left of the detectability threshold curve and the absence of such noticeable raggedness is below and to the right.

Variables which affect the perception of raster artifacts in images include the contrast density of the image and the angular orientation of the image edges. The image enhancement scheme of this invention is directed at compensating for specific spatially-defined morphological artifacts, such as jaggies or graininess, taking into consideration the spatial frequency response and perceptual sensitivity response of typical observers to raster artifacts. By addressing the specific perceptual response characteristics of observers to print image morphology, the invention provides significant improvements over the prior art.

The pattern comparison requires that the pattern match window 32, shown in FIG. 8, be of sufficient size and of appropriate shape to ensure that objectionable morphological artifacts will be appropriately detected and corrected. Based on perceptual sensitivity studies, this has been determined to require a pattern matching window which is large enough to examine features of about 600–1,000 microns in length.

Figure 9:
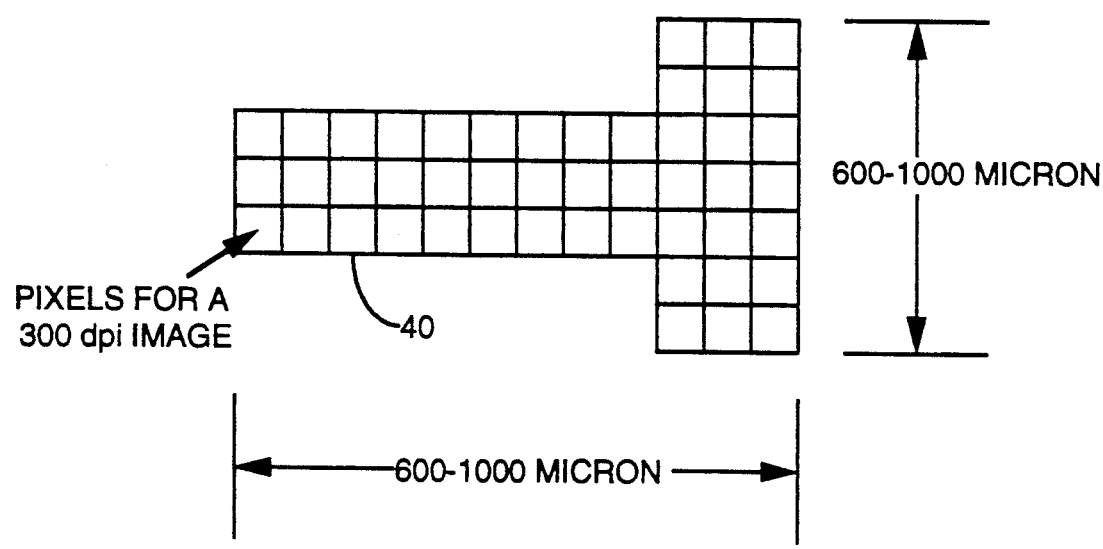
FIG. 9 shows the dimensions and pixel arrangement of a window of a preferred embodiment.

The overall number of pixels and the corresponding pixel size for window 40 shown in FIG. 9 will vary depending on nominal addressability of the marking engine. The width shown is 600–1,000 microns If window 40 is intended to identify features corresponding to 1 cycle/mm in the horizontal direction, then it should have a width of at least 1 mm (1,000 microns). For example, a 300 dpi printer has a spatial addressability of 1/300 inch, or about 85 microns. Accordingly, for that printer, a window about 12 pixels wide is used, as shown in FIG. 9 (1,000 microns divided by 85 microns per pixel). This will enable a view of the bit-map image which includes image spatial frequencies between about 1 cycle/mm (0.001 micron) and the highest spatial frequency afforded by the pixel bit-map (about 8 cycles/mm for a 300 dpi bit-map).

The same principles apply to the vertical dimension. Window 40 in its tallest section at the right is seven pixels high, which is approximately 600 microns, the lower end of the illustrated vertical range of 600–1,000 microns. However, these ranges in both the horizontal and vertical directions are merely illustrative of preferred ranges and are not critical to the successful operation of the invention.

The window of FIG. 9 is used to demonstrate how a pattern match window is utilized to identify a raster artifact (in this example a jagged image edge) which will be noticeable and/or objectionable in a printed image, by examination of a bit map window segment prior to actual printing of the image segment. The comparison window in FIG. 9 corresponds to spatial dimensions of the output image for which a periodic structure of 300 dpi raster image would be noticeable. Note that both the dimensional size and the corresponding pixel size for the window will vary, depending on the nominal addressability of the marking engine.

Figure 10:
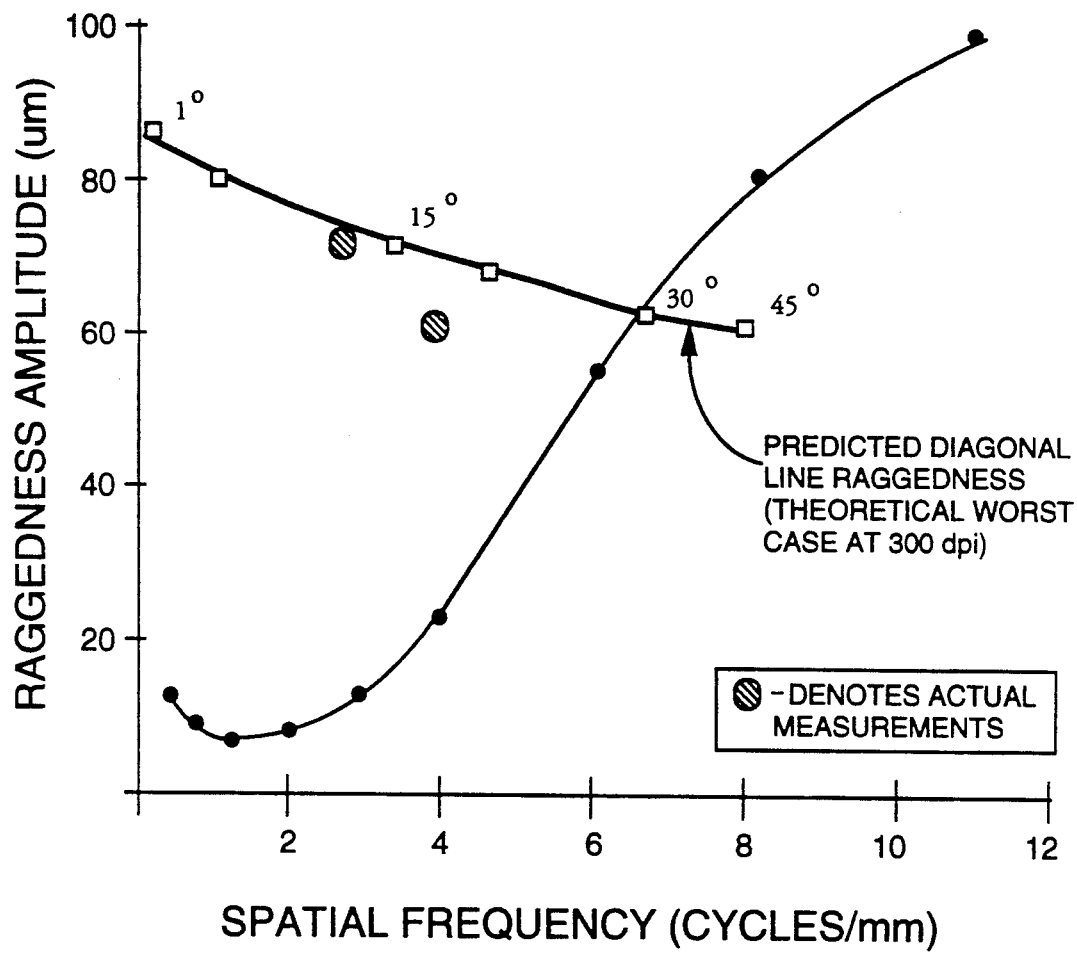
FIG. 10 illustrates edge raggedness detectability of diagonal lines vs. spatial frequency.

FIG. 10 shows that the spatial frequencies at which edge artifacts, such as raggedness are most noticeable are near 1 cycle/mm. The range of frequencies which typically are noticeable in 300 dpi printed images are from about 0.5 to 3 cycles/mm. This corresponds to line edges which are oriented between about 2° and 15° from either the horizontal or vertical axes. The method and apparatus of the invention are particularly directed at isolating these types of artifacts.

Figure 11:
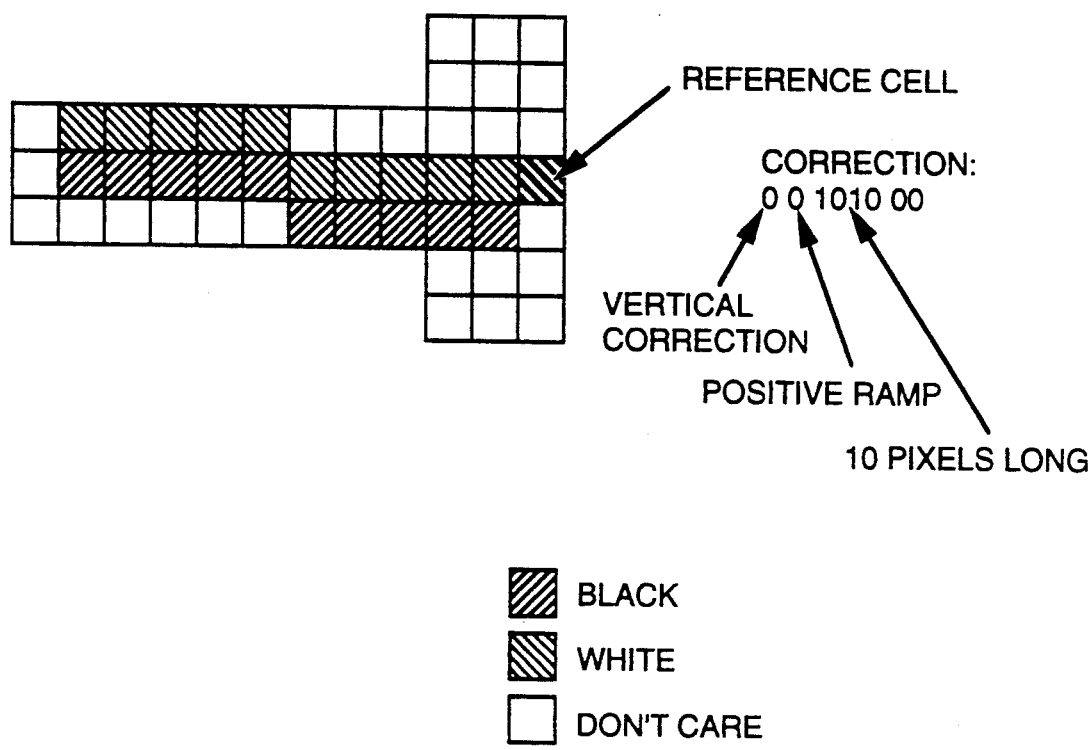
FIG. 11 illustrates a typical morphological pattern within a window.

FIG. 11 illustrates a pattern match window 40 which is utilized to identify a morphological raster artifact (in this example, a jagged image edge) which will be noticeable and/or objectionable in a printed image by examination of a bit-map window segment prior to the actual printing of the image segment. The comparison window 40 in FIG. 11 corresponds to spatial dimensions of the output image for which a periodic structure in a 300 dpi raster image would be noticeable.

The optimum window size and shape will vary depending on the types of artifacts to be isolated. Large rectangular windows maximize the ability to detect a wide variety of artifacts. In order to simplify detection and minimize pattern match hardware, smaller windows, tailored to specific types of artifacts, are preferred. It has been found that a pattern window as indicated in FIG. 9 serves well to detect jaggies in laser printer images. A rectangular window is preferred to detect halftone graininess.

The following description relates to an embodiment of the invention directed specifically at eliminating jaggies in printed images. The general techniques employed can also be applied to detecting and correcting other undesirable morphological features such as grainy halftone structure, imaging process spread function artifacts and other imaging artifacts.

Figure 12A:
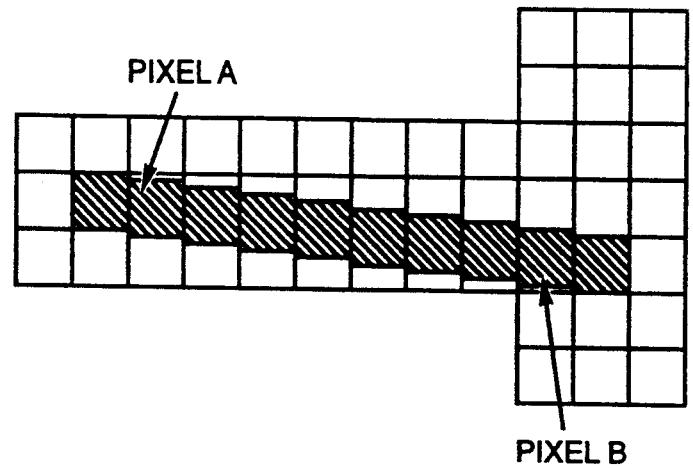
FIGS. 12A-12C illustrate a preferred alignment of the pixels from the window shown in FIG. 11 and methods to simulate the preferred alignment.
Figure 12B:
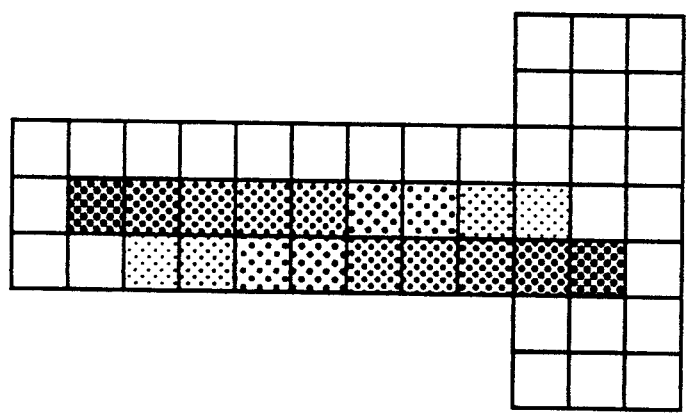
Figure 12C:
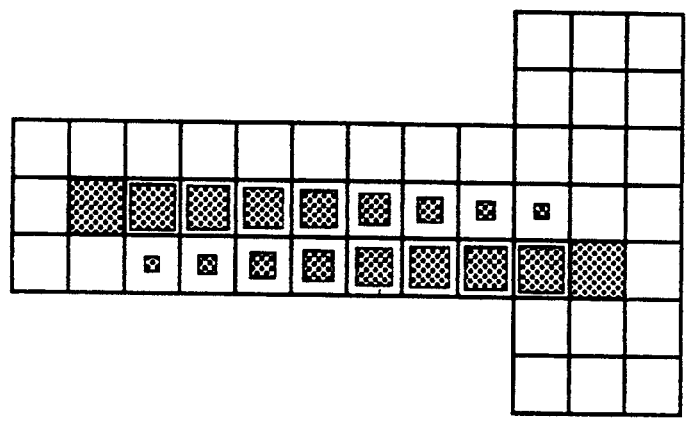

Referring to FIG. 11, a bit-mapped segment of a line edge oriented at about 12° above a horizontal is shown. The quantization limitations of the bit-mapped image result in a stair stepped rendering of the image edge from right to left, as shown, with a rise of 1 pixel for every 5 pixel horizontal run as the best approximation of the desired edge. If the bit-map is for a 300 dpi image, this stair-stepping will result in a jagged output with a rise of about 85 microns (1/300 inch) occurring periodically at about 2.5 cycles/mm. This results in noticeable jaggies in the output print. A preferred printed image would have the rendered pixels oriented in a continuous, proportionally spaced fashion corresponding to the desired angular orientation of the line segment. This correction is depicted in FIG. 12A. Correction schemes are possible which either provide the correction directly or simulate it. In the case of a laser printer, in which the laser beam scans across the imaged page, the correction shown in FIG. 12A cannot be produced directly. It must be simulated by substituting pixels which are either density or size modulated as shown in FIGS. 12B and 12C. Other imaging processes such as LED array printers, which can readily modulate pixel placement in the "process" or vertical direction, can adjust placement of pixels for "near horizontal" lines as shown in FIG. 12A. Conversely, laser printers can invoke pixel placement corrections for image edges oriented near vertical, whereas fixed array imaging systems such as LED printers must simulate vertical edge corrections using pixel size or density modulation.

The pattern comparator 22 of the invention, shown in FIG. 6, serves to identify image morphological characteristics which will result in undesirable morphological artifacts, such as jaggies or graininess, and identifies a correction value to eliminate such artifacts. A correction value is assigned, which describes a transition region for which pixel modifications are required to eliminate the artifact. In FIG. 12A, a bit-mapped rendering for a line edge to be oriented at 12 degrees is shown. The ideal rendering of this edge displaces the pixels vertically in a proportional fashion starting with pixel A and ending with pixel B. The "vertical placement" correction shown in FIG. 12A cannot be produced directly by a laser printer but it can be simulated by modulating optical density, or alternatively, pixel size, of a set of contiguous pixels between pixel A and pixel B as shown in FIGS. 12B and 12C. The correction value which is assigned by comparator 22 in FIG. 6 indicates that this is the type of image edge correction which should be used. The correction values and the modulation method of the invention will now be described.

Correction Value

Referring to FIG. 6, when a pattern match occurs in the pattern comparator 22, a correction value is assigned indicating the specific image correction required to eliminate the artifact. In the preferred embodiment, this correction value is one eight-bit byte. The correction value indicates that a pattern match has been detected and also the specific characteristics of the required image correction. These bits are as follows:

Bit #7—Indicates whether the detected image element is oriented near the horizontal or near the vertical;
Bit #6—Indicates whether the detected image element has a positive or a negative slope;
Bits #2-5—Indicates the spatial size of the correction required (which corresponds to the spatial frequency of the artifact in the output image).
Bit 1,0 Not used at the present time.

The assigned correction value emitted from pattern comparator 22 maps to a full definition of the correction required to the video signal in order to eliminate the artifact. The correction value is passed to video modulator 24, where the appropriate correction technique is invoked.

In a preferred embodiment of the invention, two methods of image correction are provided. One method is to invoke the correction in the current raster scan line only. In this instance, the entire correction for image elements oriented towards the horizontal (i.e., along the fast scan axis) is invoked as one single correction ramp for the ensuing video stream. This method is called a scan line oriented correction method. Corrections to image elements involving more than one scan line are implemented on a scan line by scan line basis. This means that only that portion of the correction to be invoked in the current scan line is defined. The process is repeated for each subsequent scan line which contributes to the image element of interest as these subsequent scan lines appear within in the pattern match window.

In the second alternative method, the entire definition of corrections required both for horizontally and vertically oriented image elements occurs only once for each artifact to be corrected. The actual correction occurs on a scan line basis, since this is a physical constraint imposed by the sequential raster scan nature of raster output devices, such as laser printers. In this second method, the full correction definition for horizontally or vertically oriented edges is passed to modulator 24 where the actual corrections are made.

Video modulator 24 includes look-up translator 23 and video modulator 24. Look-up translator 23 translates the correction value emitted by the pattern comparator 22 into specific modifications of the video signal. This can either be (1) a modified string of high frequency video which is subsequently serialized and substituted for the corresponding unmodified video string; or (2) the control variables for the modulator specifying: the pixel placement modulation (video drag), the run length modulation, the positive or negative density modulation and the video chopping duty cycle.

These four control variables permit four degrees of freedom in defining video segment alterations. These video segment alterations are very effective in eliminating the appearance of morphological artifacts in printed images. It should also be noted that these variables are also useful for other types of image enhancements, such as simulating gray scale and reducing granularity of image elements such as halftone dots.

Video modulator 24 is capable of modulating the video signal at a much higher frequency than the normal video pixel clock for a laser printer. Video frequencies of 8 to 16 times the normal video pixel clock frequency for 300 dpi printers have been found to work effectively.

Video modulator 24 emits a video signal string which overrides the normal video signal for enhanced portions of the image. Video modulator 24 invokes corrections by emitting appropriate modified video as defined by the look-up translator 23. These modifications include alterations to the original bit-mapped rendering of the image resulting from altered pixel placement, pixel size or pixel optical density.

Figure 13:
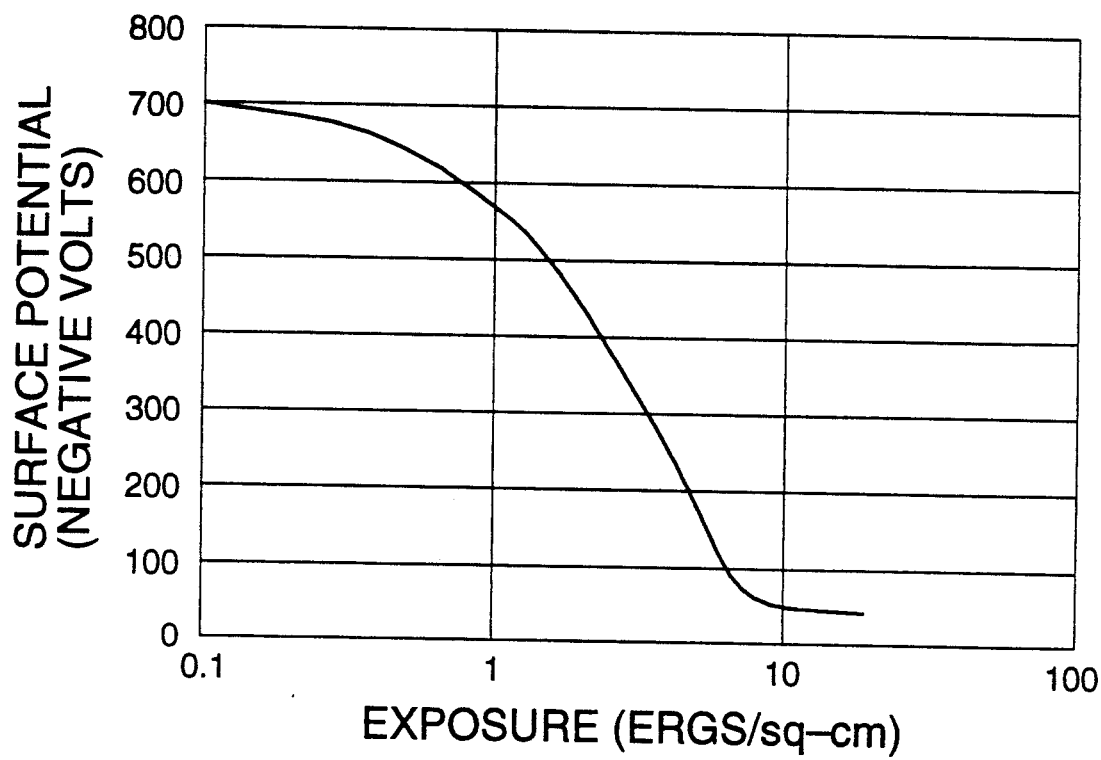
FIG. 13 is a curve showing the photo-induced discharge curve of a photoconductor.
Figure 14A:
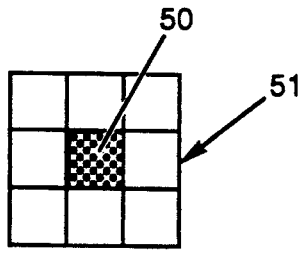
FIG. 14 illustrates various types of pixel modulation.
Figure 14B:
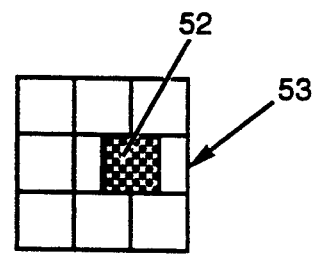
Figure 14C:
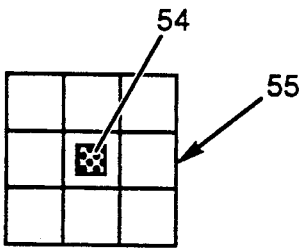
Figure 14D:
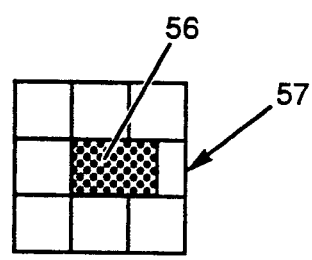
Figure 14E:
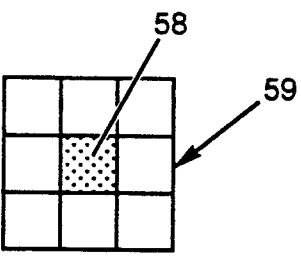

Pixel optical density can be altered in an electrophotographic printer by altering the localized exposure of the printer photoconductor by the scanning laser beam, as is well known in the art. Exposure of the photoconductor results in a proportional discharge of the photoconductor as a function of the exposure level. This characteristic response of a photoconductor is referred to as a photo-induced discharge curve (PIDC) and is illustrated graphically in FIG. 13.

The exposure of the photoconductor is a function of laser beam intensity and exposure time at each localized position on the OPC. That is, $$E = I \times t$$

Where
E = Exposure
I = Laser beam intensity
t = Exposure time

By modulating the exposure value locally on the photoconductor, it is possible to modify the amount of toner developed on the photoconductor and thus to modify the resultant localized output density of printed image elements. This characteristic response of electrophotographic systems is referred to as the dynamic range. However, this response usually is not sufficiently stable to be used to produce continuous tone images. The dynamic range of electrophotographic systems is sufficient, however, to provide an additional degree of freedom in smoothing the harsh transitions associated with jaggies, graininess and other morphological artifacts in printed images.

Referring to FIG. 14, various types of pixel modulation techniques are shown. A standard video pixel 50 is shown at the center of grid 51. One way to modify that pixel is by simply moving it, called positional modulation, as shown by pixel 52 in grid 53. Another technique is called diameter modulation, as shown by pixel 54 in grid 55. Still another modulation technique is called stroke length modulation, as shown by pixel 56 in grid 57. Finally, density modulation may be employed, as shown by pixel 58 in grid 59.

Figure 15:
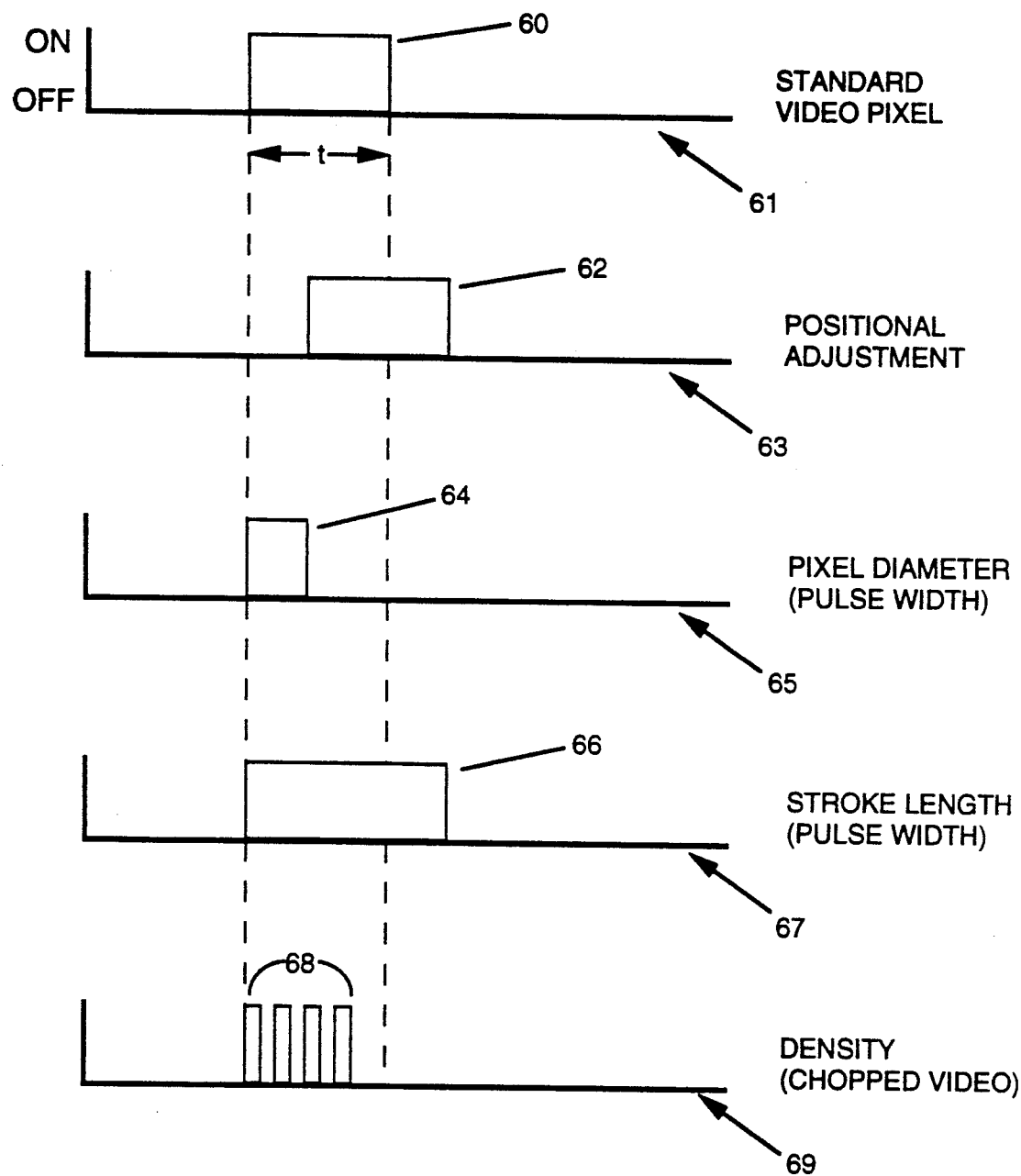
FIG. 15 illustrates the signals used for the pixel modulation of FIG. 14.

Referring to FIG. 15, the video signals used for modulating the pixel forms discussed above are shown. The standard video signal 60 for a video pixel is shown in the first graph 61. The signal 62 which produces a positional adjustment is shown in graph 63. The signal 64 which produces a reduced pixel size is shown in graph 65. Signal 66 which produces a pixel having an enhanced stroke length is shown in graph 67. The chopped video signal 68 which produces a less dense pixel is shown in graph 69.

As indicated above, the exposure value is the product of laser beam intensity and exposure time at a particular location on the surface of a photoconductor. The embodiment of the invention shown by pixel 58 in grid 59 in FIG. 14 exploits the variability of this exposure value by use of a chopping video signal at high frequency, shown in graph 69 in FIG. 15, to modulate the exposure time as detected by the photoconductor. This permits the invocation of pixels or image segments of variable output density to smooth the appearance of image transition regions such as jaggies.

Correcting Halftone Graininess

The apparatus described above for correcting jaggies in raster images can be utilized in a similar fashion to correct other objectionable morphological characteristics, such as grainy halftone images. The system sub-elements for this implementation are essentially the same as those depicted in FIG. 6 for the correction of jaggies. Preferably the size of the comparison window in pattern comparator 22 is changed to accommodate the range of halftone screen frequencies of interest. The window must be large enough to capture the lowest frequency screen of interest (i.e., the largest dot). Furthermore, the comparison window shape is preferably altered to accommodate halftone pixels, for example, to a rectangular window, as will be explained below. In addition, the correction identifier and specific video correction algorithms may be modified to optimize the smoothing of halftone dots. An example of how a halftone dot, which might result in a grainy image pattern if produced over a large area of a page, is altered to produce lower graininess, is shown in FIGS. 18A-18C.

Figure 16:
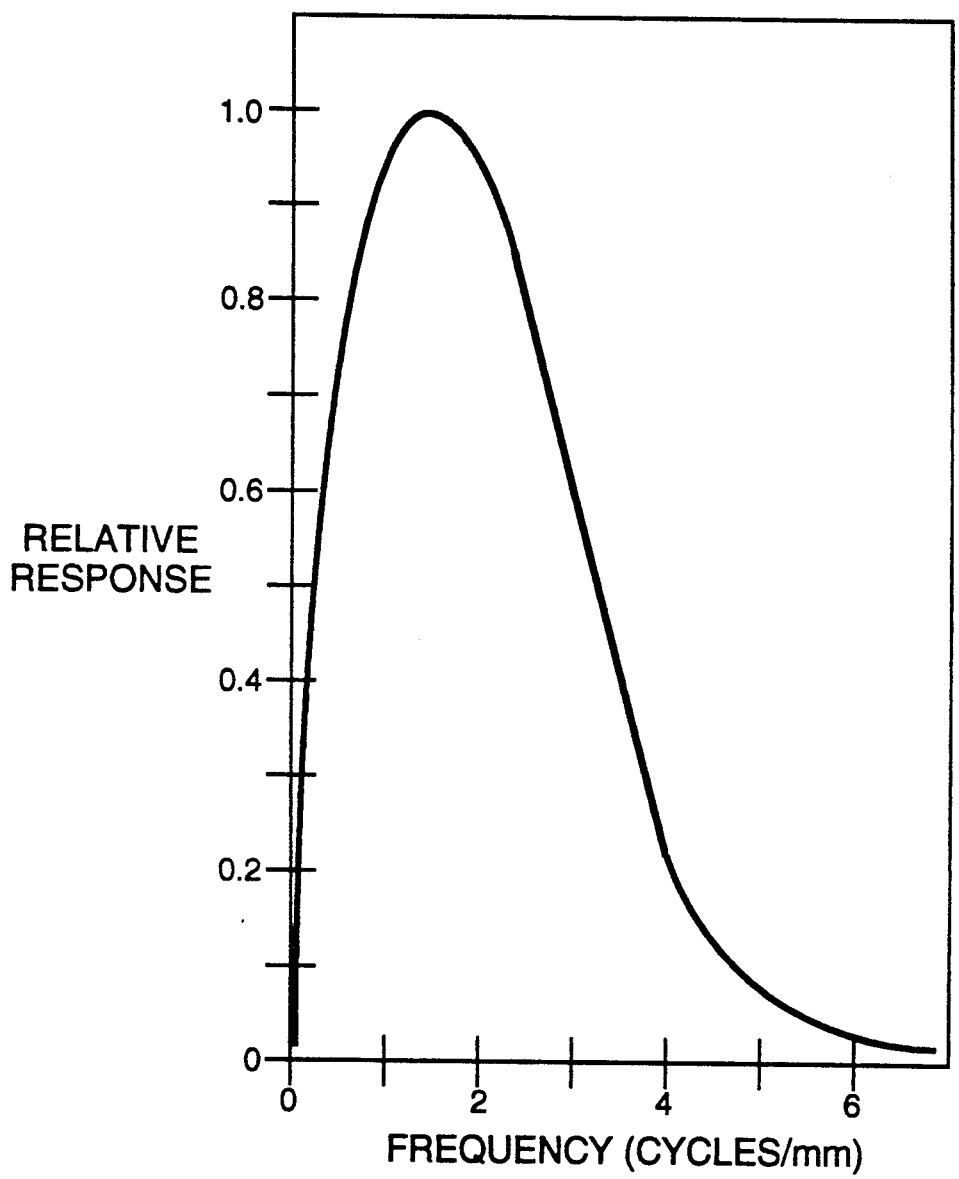
FIG. 16 is a graph of visual response at normal viewing distance plotted against frequency.
Figure 17:
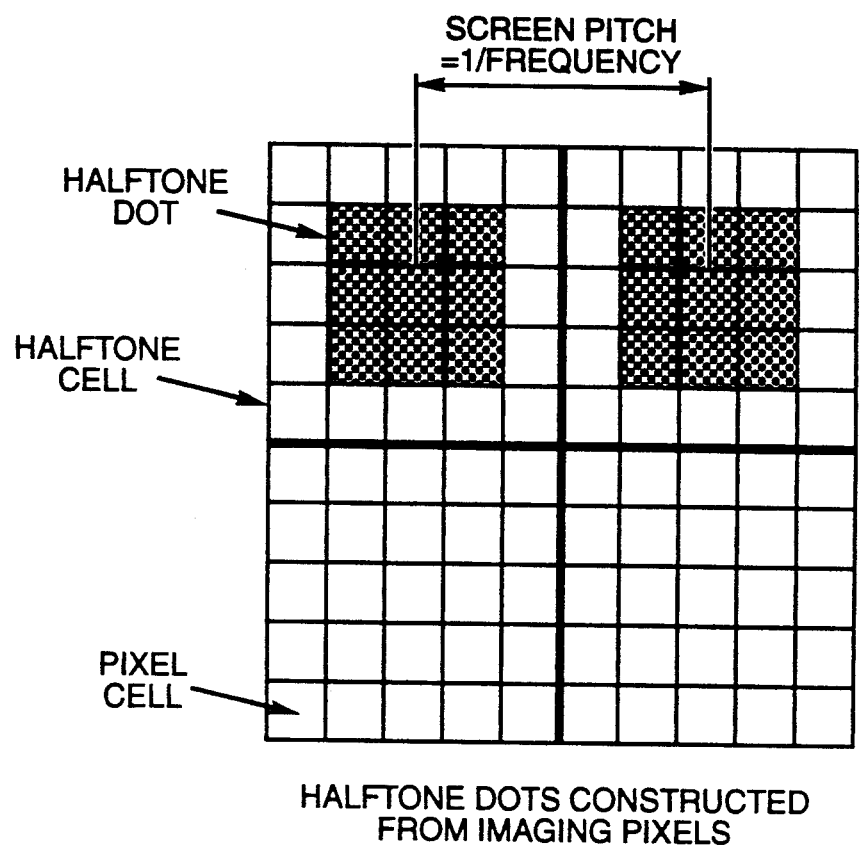
FIG. 17 shows two halftone dots constructed from imaging pixels.
Figure 18A:
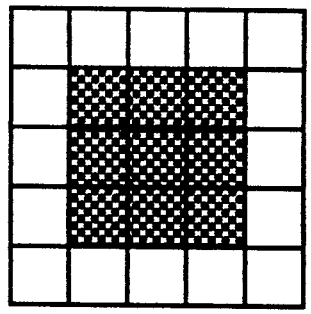
FIGS. 18A-18C show various ways to modify halftone dots.

In FIG. 18A a halftone dot produced in a conventional fashion is shown. This halftone dot is produced by a tightly bound cluster of image pixels. The halftone cell shown in FIG. 18A consists of a 5×5 array of image pixel locations. This produces halftone cells spaced at 300/5 or 60 cells (dots) per inch. The optical density simulated by this halftone cell is normally varied, or modulated, by filling in the appropriate number of pixel locations with black pixels. The more black pixels in the cell, the higher the integrated optical density. If the 5×5 array of halftone cells depicted in FIG. 18A is printed on a 300 dpi printer, the resulting image will have a noticeable and objectionable halftone structure occurring at a spatial frequency of 60 cycles/inch (corresponding to 60 halftone dots/inch). This objectionable structure will be very noticeable because the visual response to an image structure at a frequency of 60 cycles/inch (2.4 cycles/mm) is very high, as indicated in FIG. 16.

The subject invention can be used to detect and reduce objectionable graininess in halftone images by altering the spatial frequency content of the halftone image and/or by demodulating the objectionable spatial frequencies. FIGS. 18B and 18C show two examples of corrections which reduce the graininess of the halftone cell shown in FIG. 18A without altering the densitometric content of FIG. 18A.

Figure 18B:
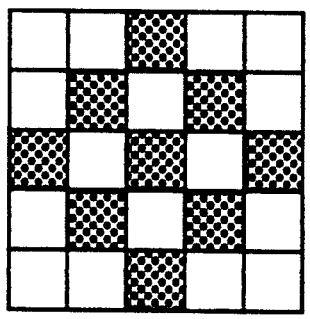
Figure 18C:
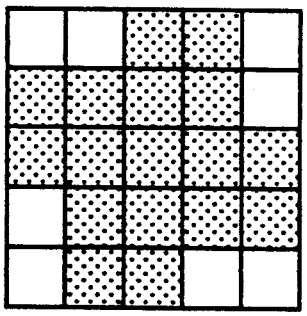
Figure 19:
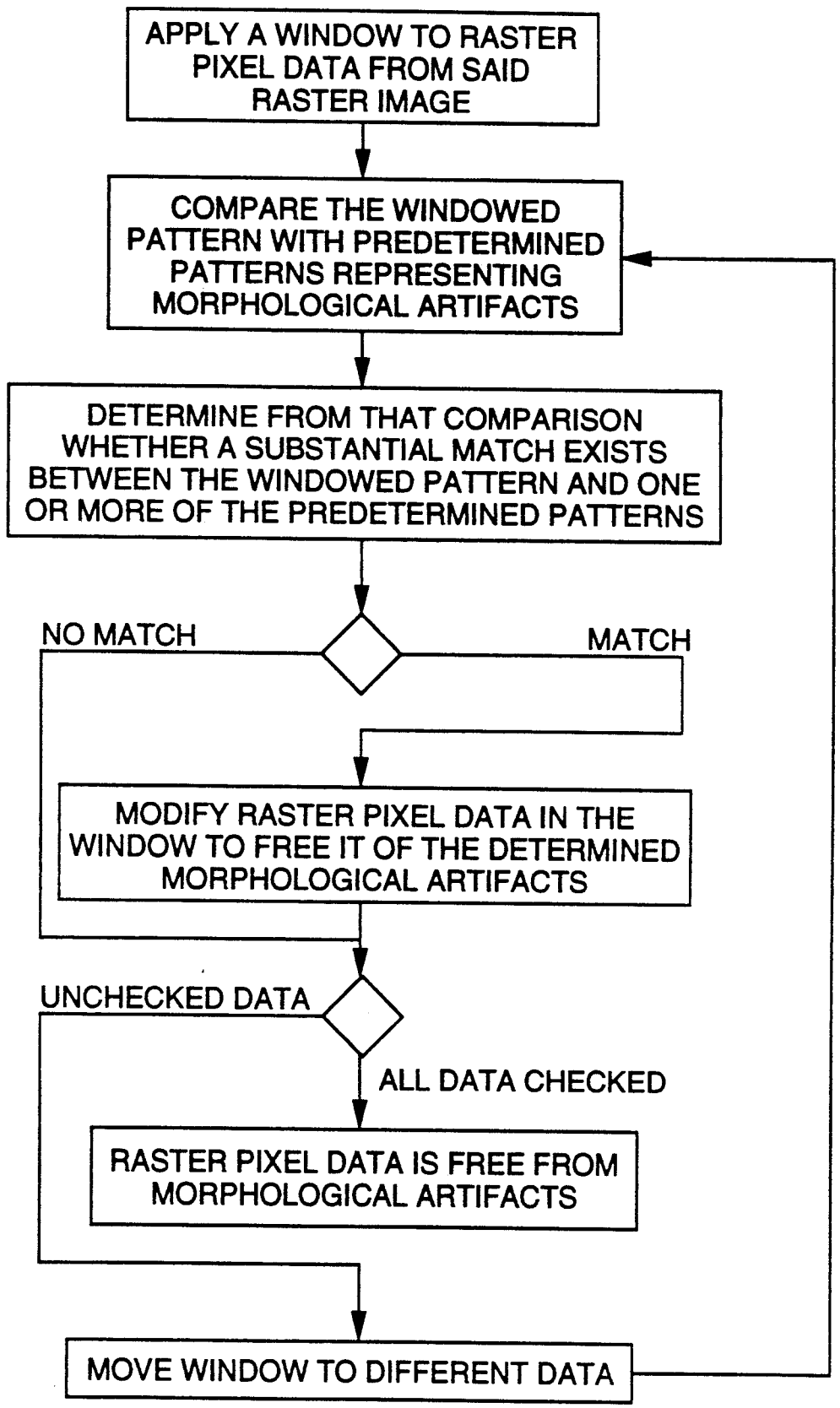
FIG. 19 is a flow chart of the method of the invention.

FIG. 18B depicts the imaging pixels, which were clustered together in FIG. 18A, dispersed throughout the halftone cell. Dispersing the pixels in this fashion serves to demodulate the 60 cycle/inch component of the halftone pattern typified by FIG. 18A. This is accomplished without altering the integrated densitometric content of the halftone cell, thereby preserving the image content when viewed at a normal viewing distance.

FIG. 18C depicts an alternative correction to reduce the graininess associated with the halftone pattern of FIG. 18A. In FIG. 18C, the cluster of black pixels of FIG. 18A have been replaced by a larger number of gray pixels. The number and optical density of the gray pixels in FIG. 18C must be selected to produce the same integrated optical density as shown in FIG. 18A in order to preserve the densitometric content. However, by substituting these gray pixels, the 60 cycle/inch graininess signal of the arrangement of FIG. 18A is reduced (demodulated), producing a more pleasing halftone pattern. The gray pixels of FIG. 18C can be produced in a laser printer by invoking temporal modulation of the laser beam, causing exposure of the photoconductor at an intermediate point of the photo-induced discharge curve.

The halftone cell corrections illustrated in FIG. 18 are by no means an exhaustive list. Many other specific corrections may be used for altering the spatial frequency content and/or demodulating the objectionable halftone frequencies, as will be appreciated by those skilled in the art. The essential aspects of the invention, used to reduce objectionable graininess of halftone images, are the same as those described earlier for eliminating jaggies and other morphological artifacts. These relate to detecting objectionable artifacts occurring at conditions of maximum viewer sensitivity, identifying appropriate corrections to alter the spatial frequency characteristics of those artifacts and invoking the corrections by modifying the video stream.

As will be understood by those skilled in the art, many changes in the apparatus and methods described above may be made by the skilled practitioner without departing from the spirit and scope of the invention, which should be limited only as set forth in the claims which follow.

We claim:

1. A method of enhancing raster pixel data from a raster image to improve the appearance of the rendered image by modifying morphological artifacts which normally occur in raster image systems, comprising:

applying a window to a portion of said raster pixel data from said raster image to define a block of said raster pixel data having a predetermined area which may contain morphological artifacts;

comparing the pattern of said raster data within said window with a plurality of predetermined patterns representing morphological artifacts;

determining from said comparison whether a substantial match exists between said block of raster pixel data within said window and one or more of said plurality of predetermined patterns representing morphological artifacts;

in the event of a match, modifying at least a portion of said raster pixel data to provide an enhanced block of raster pixel data with improved appearance which de-emphasizes said morphological artifacts; and applying said window to a different block of raster pixel data and repeating the process.

2. A method of enhancing raster pixel data from a raster image to improve the appearance of the rendered image by modifying morphological artifacts which normally occur in raster image systems, comprising:

applying a window to a portion of said raster pixel data from said raster image to define a block of said raster pixel data having a predetermined area which may contain morphological artifacts;

comparing the pattern of said raster data within said window with a plurality of predetermined patterns representing morphological artifacts;

determining from said comparison whether a substantial match exists between said block of raster pixel data within said window and one or more of said plurality of predetermined patterns representing morphological artifacts;

in the event of a match, modifying at least a portion of said raster pixel data to provide an enhanced block of raster pixel data with improved appearance which de-emphasizes said morphological artifacts; and moving said window across the pixel map of said raster image and repeating the process.

3. A method of enhancing raster pixel data from a raster image to improve the appearance of the rendered image by modifying morphological artifacts which normally occur in raster image systems, comprising:

applying a window to a portion of said raster pixel data from said raster image to define a block of said raster pixel data having a predetermined area which may contain morphological artifacts;

comparing the pattern of said raster data within said window with a plurality of predetermined patterns representing morphological artifacts;

determining from said comparison whether a substantial match exists between said block of raster pixel data within said window and one or more of said plurality of predetermined patterns representing morphological artifacts;

in the event of a match, modifying at least a portion of said raster pixel data to provide an enhanced block of raster pixel data with improved appearance which de-emphasizes said morphological artifacts; and moving said window down the page in raster line sequence and repeating the process.

4. A method of enhancing raster pixel data from a raster image to improve the appearance of the rendered image by modifying morphological artifacts which normally occur in raster image systems, comprising:

applying a window to a portion of said raster pixel data from said raster image to define a block of said raster pixel data having a predetermined area located within a predetermined band of raster scan lines which may contain morphological artifacts;

comparing the pattern of said raster data within said window with a plurality of predetermined patterns representing morphological artifacts;

determining from said comparison whether a substantial match exists between said block of raster pixel data within said window and one or more of said plurality of predetermined patterns representing morphological artifacts;

in the event of a match, modifying at least a portion of said raster pixel data to provide an enhanced block of raster pixel data with improved appearance which de-emphasizes said morphological artifacts;

moving said window across the pixel map of said raster image and repeating the process; and moving said window down the page in raster line sequence and repeating the process.

5. Apparatus for enhancing raster pixel data from a raster image to improve the appearance of the rendered image by modifying morphological artifacts which normally occur in raster image systems, comprising:

means for applying a window to a portion of said raster pixel data from said raster image to define a block of said raster pixel data having a predetermined area which may contain morphological artifacts;

means for comparing the pattern of said raster data within said window with a plurality of predetermined patterns representing morphological artifacts;

means for determining from said comparison whether a substantial match exists between said block of raster pixel data within said window and one or more of said plurality of predetermined patterns representing morphological artifacts;

means for modifying, in the event of a match, at least a portion of said raster pixel data to provide an enhanced block of raster pixel data with improved appearance which de-emphasizes said morphological artifacts; and means for applying said window to a different block of raster pixel data and repeating the process.

6. Apparatus for enhancing raster pixel data from a raster image to improve the appearance of the rendered image by modifying morphological artifacts which normally occur in raster image systems, comprising:

means for applying a window to a portion of said raster pixel data from said raster image to define a block of said raster pixel data having a predetermined area which may contain morphological artifacts;

means for comparing the pattern of said raster data within said window with a plurality of predetermined patterns representing morphological artifacts;

means for determining from said comparison whether a substantial match exists between said block of raster pixel data within said window and one or more of said plurality of predetermined patterns representing morphological artifacts;

means for modifying, in the event of a match, at least a portion of said raster pixel data to provide an enhanced block of raster pixel data with improved appearance which de-emphasizes said morphological artifacts; and means for moving said window across the pixel map of said raster image and repeating the process.

7. Apparatus for enhancing raster pixel data from a raster image to improve the appearance of the rendered image by modifying morphological artifacts which normally occur in raster image systems, comprising:

means for applying a window to a portion of said raster pixel data from said raster image to define a block of said raster pixel data having a predetermined area which may contain morphological artifacts;

means for comparing the pattern of said raster data within said window with a plurality of predetermined patterns representing morphological artifacts;

means for determining from said comparison whether a substantial match exists between said block of raster pixel data within said window and one or more of said plurality of predetermined patterns representing morphological artifacts;

means for modifying, in the event of a match, at least a portion of said raster pixel data to provide an enhanced block of raster pixel data with improved appearance which de-emphasizes said morphological artifacts; and means for moving said window down the page in raster line sequence and repeating the process.

8. Apparatus for enhancing raster pixel data from a raster image to improve the appearance of the rendered image by modifying morphological artifacts which normally occur in raster image systems, comprising:

means for applying a window to a portion of said raster pixel data from said raster image to define a block of said raster pixel data having a predetermined area located within a predetermined band of raster scan lines which may contain morphological artifacts;

means for comparing the pattern of said raster data within said window with a plurality of predetermined patterns representing morphological artifacts;

means for determining from said comparison whether a substantial match exists between said block of raster pixel data within said window and one or more of said plurality of predetermined patterns representing morphological artifacts;

means for modifying, in the event of a match, at least a portion of said raster pixel data to provide an enhanced block of raster pixel data with improved appearance which de-emphasizes said morphological artifacts; and means for moving said window across the pixel map of said raster image and repeating the process; and means for moving said window down the page in raster line sequence and repeating the process.

* * * * *